United States Patent [19]
Taylor

[11] Patent Number: 5,102,750
[45] Date of Patent: Apr. 7, 1992

[54] EFFICIENCY ENHANCEMENT FOR SOLID-ELECTROLYTE FUEL CELL

[75] Inventor: Thomas M. Taylor, Flanders, N.J.

[73] Assignee: Bell Communications Research, Inc., Livingston, N.J.

[21] Appl. No.: 629,220

[22] Filed: Dec. 18, 1990

[51] Int. Cl.⁵ .............................................. H01M 8/10
[52] U.S. Cl. ......................................... 429/30; 429/44
[58] Field of Search ....................... 429/30, 34, 40, 44, 429/12

[56] References Cited

U.S. PATENT DOCUMENTS

| | | |
|---|---|---|
| 4,248,941 | 2/1981 | Louis et al. ............................ 429/13 |
| 4,863,813 | 9/1989 | Dyer ...................................... 429/33 |
| 4,894,301 | 1/1990 | Dyer ...................................... 429/193 |
| 4,988,582 | 1/1991 | Dyer ...................................... 429/30 |

Primary Examiner—Anthony Skapars
Attorney, Agent, or Firm—Leonard Charles Suchyta; Lionel N. White

[57] ABSTRACT

In a solid-electrolyte fuel cell of the type described in U.S. Pat. No. 4,863,813, a permeable catalytic electrode in contact with the solid electrolyte is ordinarily exposed to a mixture comprising an oxidizer and a hydrogen-containing fuel. To increase the fuel efficiency of the cell, the permeable electrode is patterned and coated with a material that is permeable to the fuel but relatively impermeable to the oxidizer. The oxidizer enters the electrolyte through channels where the surface of the electrolyte is not covered by the patterned and coated electrode.

20 Claims, 2 Drawing Sheets

EFFICIENCY ENHANCEMENT FOR SOLID-ELECTROLYTE FUEL CELL

BACKGROUND OF THE INVENTION

This invention relates to fuel cells and, more particularly, to cells which consume gaseous or liquid fuels and produce electrical energy.

An advantageous fuel cell for energy conversion is described in U.S. Pat. No. 4,863,813 (for which a reissue application, Ser. No. 552,800, was filed on July 13, 1990). In a cell of the type described therein, a hydrogen-containing material at room temperature, such as a gaseous mixture of hydrogen and oxygen, is directly converted to direct-current electrical energy and the only reaction product is water.

In one specific illustrative such cell, a submicrometer-thick gas-permeable ionically conducting membrane made of pseudoboehmite is deposited on an electrode that comprises a platinized impermeable substrate. This membrane constitutes the solid electrolyte of the cell. A layer, of platinum for example, is deposited on the top surface of the membrane to form the second electrode of the cell. The entirety of the second electrode is sufficiently porous (permeable) to allow the gas mixture to pass therethrough.

For a hydrogen/air mixture, such a cell provides useful current at an output voltage as large as about one volt, independent of the ratio of hydrogen to air for hydrogen > 50%. In practice, the efficiency of such a cell in converting the fuel mixture to electrical energy is impaired by a side reaction that occurs on the permeable electrode. In this side reaction, which accounts for about 90% of the fuel inefficiency of the cell, hydrogen and oxygen combine to form water. Only heat is produced in this side reaction. Nothing is thereby contributed to the electrical output of the cell.

Fuel efficiency is the single most important parameter that must be improved to upscale a basic cell of the aforespecified type to higher power levels. Such improvement would of course significantly increase the applications for which the cell would be regarded as an attractive energy source.

SUMMARY OF THE INVENTION

In accordance with the principles of the present invention, a fuel cell of the type specified above is modified to substantially reduce the amount of oxidizer in a fuel/oxidizer mixture that can contact the permeable electrode. At the same time, access is provided for the oxidizer to enter the solid electrolyte and migrate to the impermeable electrode. In this way, a fuel-consuming side reaction at the permeable electrode is substantially reduced and the fuel efficiency of the cell is consequently increased.

In a particular embodiment of the invention, the permeable electrode comprises multiple spaced-apart portions that are electrically connected together. These portions are coated with a material that is relatively permeable to the fuel but relatively impermeable to the oxidizer. The oxidizer enters the surface of the solid electrolyte mainly via the spaces between the electrode portions.

BRIEF DESCRIPTION OF THE DRAWING

A complete understanding of the present invention and of the above and other features and advantages thereof will be apparent from a consideration of the detailed description below taken in conjunction with the accompanying drawing, not drawn to scale, in which.

DETAILED DESCRIPTION

In accordance with the principles of the present invention a basic fuel cell of the type described in U.S. Pat. No. 4,863,813 is modified to increase its fuel efficiency. A typical priorly known such basic cell is depicted in FIG. 1.

Figure 1:
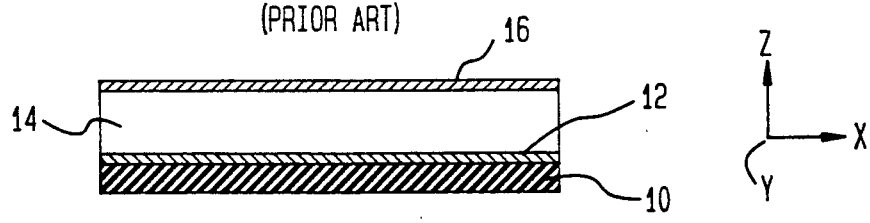
FIG. 1 is a simplified schematic depiction in cross-section of a conventional fuel cell of the type described in the aforecited Dyer patent.

A hydrogen-containing fuel/oxidizer mixture is utilized to power the cell shown in FIG. 1. Suitable fuels that are consumed by the FIG. 1 cell to produce electrical energy are hydrogen-containing materials such as hydrogen, methane and methanol. The fuel can be supplied to the cell in liquid or gaseous form.

Further, many suitable oxidizers or oxidizer species are available for combining with the fuel to provide a mixture suitable for powering the FIG. 1 cell. In practice, the most common oxidizers are gaseous oxygen and air.

The specific illustrative priorly known cell shown in FIG. 1 comprises a substrate 10 that is designed to be impermeable to the mixture of fuel and oxidizer materials that is utilized to power the cell. By way of example, the substrate is made of quartz and is about 0.32 centimeters (cm) thick in the indicated Z direction.

A catalyst layer 12 (FIG. 1) overlies the top planar surface of the substrate 10. As described in U.S. Pat. No. 4,863,813, various materials are suitable for forming such a catalyst layer. Suitable materials include platinum, palladium, gold, nickel and various alloys of these materials. Other suitable catalyst materials include nonmetals such as electronically conducting mixed oxides with a spinel or perovskite structure.

The catalyst layer 12 of FIG. 1 is, for example, about 1000-to-5000 nanometers (nm) thick. Due to the aforementioned impermeability of the substrate 10, none of the fuel/oxider mixture supplied to the depicted cell is able to pass through the layer 12 from the bottom side thereof. Thus, together the substrate 10 and the layer 12 constitute an impermeable electrode assembly. Alternatively, as described in U.S. Pat. No. 4,863,813, the layer 12 can be made sufficiently thick that it by itself is impermeable to the fuel/oxidizer mixture. In any case, the catalyst layer 12 of FIG. 1 constitutes one electrode of the depicted fuel cell.

As shown in FIG. 1, a layer 14 that comprises a solid electrolyte overlies the top surface of the catalyst layer 12. As described in detail in U.S. Pat. No. 4,863,813, the layer 14 is made of a material that is characterized by a usefully high conductivity for hydrogen ions (H+) or hydronium ions ($H_3O^+$). Additionally, the layer 14 is permeable to the fuel, to the oxidizer and to products of the reaction between the fuel and oxidizer. Further, the layer 14 constitutes an electron insulator, with a resistivity of at least about $10^6$ ohm-centimeters. Also, in preferred embodiments the solid electrolyte is capable of being made in very thin layers. Herein, for illustrative purposes, the Z-direction thickness of the layer 14 will be assumed to be about 0.5 micrometers ($\mu m$).

Two classes of solid-electrolyte materials are suitable for forming the layer shown in FIG. 1. One class consists of selected hydrated aluminum oxides. The other class consists of selected polymeric materials.

The physical properties and conditions for forming layers of hydrated aluminum oxide have been extensively studied. A review of many of these studies appears as Chapter 3 of "Oxides and Oxide Films", edited by J. W. Diggle and N. K. Vijh, volume 4, Marcer Dekker, New York, 1976, pages 169–253. Depending on the particular conditions, the product of the reaction between aluminum and water includes bohemite, pseudoboehmite, bayerite, gibbsite and combinations of these materials. One of these materials, pseudoboehmite, has been found to be particularly appropriate for inclusion in devices made in accordance with the invention. Layers including at least 50% pseudoboehmite are preferred, layers including at least 95% pseudoboehmite being most preferred.

Suitable permeable solid-electrolyte layers of hydrated aluminum oxide can be produced by several methods. For example, such a layer forms on a clean metallic aluminum surface exposed to water in liquid form in a container or exposed to water in vapor form in a chamber in a temperature range of about 20-to-374 degrees Celsius. Pseudoboehmite is predominant in layers produced in the temperature range from approximately 90-to-100 degrees Celsius. Solid-electrolyte layers can also be produced by exposing aluminum oxide to water and/or liquid vapor phases. The pseudoboehmite form is predominant in layers produced in the temperature range of about 90-to-100 degrees Celsius.

Suitable aluminum oxide layers can also be produced by anodization of metallic aluminum. Thicker layers can be produced by a multi-layer process that includes alternate steps of aluminum deposition and exposure of the aluminum or anodized aluminum surface to water. Radio-frequency backsputtering can be used during deposition of the metallic aluminum prior to water exposure. Such backsputtering can improve the uniformity of coverage of the aluminum and therefore also of the permeable solid-electrolyte layer.

The production of a hydrated aluminum oxide layer from an anodically formed aluminum oxide layer has the advantage that such a layer is characteristically of a very uniform thickness and can be grown precisely to a specified thickness. In the multilayer process comprising sequential aluminum depositions, solid-electrolyte layers of approximately 500 nm thickness have been produced with 3-to-5 sequential processing steps. More generally, hydrated aluminum oxide layers about 300 nm-to-10 $\mu m$ thick are suitable for forming the solid-electrolyte layer 14 shown in FIG. 1.

Additionally, carbon-based polymeric materials are known which possess the required hydrogen ion conductivity, electronic resistivity and permeability to fuel, oxidizer and products of the reaction between them. Perfluorinated sulfonic acid is an example of a polymer in which ionic hydrogen species can be readily mobilized. This supplies the necessary hydrogen ion mobility. Such polymers commonly have sufficient gas permeability and electronic resistance to be useful as solid electrolytes in assemblies made in accordance with the principles of the present invention.

One specific illustrative polymeric material suitable for forming the solid-electrolyte layer 14 (FIG. 1) is the commericially available perfluorinated sulfonic acid polymer known as Nafion. In practice, this material is much easier to use than pseudoboehmite because Nafion can be solution-cast to form thin layers in the range of about 1-to-10 $\mu m$.

Layers 16 shown in FIG. 1 overlies the top surface of the solid electrolyte 14. The layer 16 comprises a permeable catalyst made of a material such as, for example, platinum, palladium, gold, nickel or alloys of these materials. Other suitable catalytic materials include non-metals such as electronically conducting mixed oxides with a spinel or pervskite structure.

The layer 16 of FIG. 1 is permeable in the sense that it permits the fuel/oxidizer mixture to pass through it. Illustratively, this can be realized by sputtering a thin inherently porous layer, up to, for example, a thickness of about 100 nm, on the surface of the layer 14. For thicker layers that do not inherently exhibit the required porosity to the fuel/oxidizer mixture, the layer 16 can be rendered permeable by forming therein a pattern of through-apertures. The permeable layer 16 constitutes the other electrode of the depicted fuel cell.

Due to the fact that the topmost layer 16 of the priorly known cell shown in FIG. 1 is exposed to the fuel/oxidizer mixture, constituents of that mixture combine on the catalyst layer 16 to form water and produce heat. In this side reaction, fuel which otherwise would be available to contribute to the electrical output of the cell is consumed. This result and the heat that is produced in the process are undesirable consequences of the noted side reaction.

In accordance with the principles of the present invention, a more fuel-efficient cell that operates at lower temperatures than the FIG. 1 cell is provided. This is done by eliminating or substantially reducing the aforedescribed side reaction that occurs on the catalyst layer 16 shown in FIG. 1.

Figure 2:
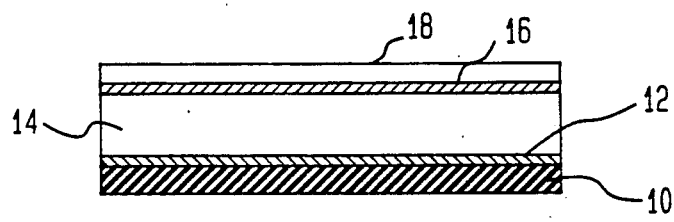
FIG. 2, which shows a coating overlying the top electrode of the FIG. 1 ells, represents the initial step of a fabrication sequence designed to modify the FIG. 1 cell to form a specific illustrative embodiment of the principles of the present invention.

For illustrative purposes, parts of the cell depicted in FIG. 2 will be assumed herein to be identical to corresponding parts of the FIG. 1 cell. These parts are identified in FIG. 2 by the same respective reference numerals employed therefor in FIG. 1. Thus, the FIG. 2 cell also includes a substrate 10, a bottom catalyst layer 12, a solid-electrolyte layer 14 and a top catalyst layer 16.

One specific illustrative way of modifying the FIG. 1 cell to form an embodiment of the present invention involves the initial step of coating the entire top surface of the permeable electrode 16 with a layer 18, as indicated in FIG. 2. In accordance with the invention, the layer 18 is made of a material that is relatively permeable to the hydrogen-containing fuel contained in the fuel/oxidizer mixture supplied to the cell but relatively impermeable to the oxidizer in the mixture. Many materials exhibiting such selectivity are known.

Illustratively, the layer 18 shown in FIG. 2 comprises a coating about 0.1 $\mu m$ thick made of a polymer material such as nylon, polysulfone, polytrifluorochloroethylene or polypropylene. Such materials are known to be relatively permeable to hydrogen but relatively impermeable to oxygen.

Many conventional ways are known for forming the layer 18 of FIG. 2. Thus, for example, the layer 18 can be formed simply by dipping the electrode 16 in a solution containing one of the aforespecified polymers in suspension. Or the layer 18 can be formed in a standard plasma polymerization step.

Next, in accordance with the principles of the present invention, spaced-apart channels are formed in the FIG. 2 structure. The channels, which extend through both the polymer layer 18 and the electrode layer 16, are formed, for example, by conventional oblation, etching or microscratching techniques. A top view of the structure after formation of the channels is shown in FIG. 3.

Figure 3:
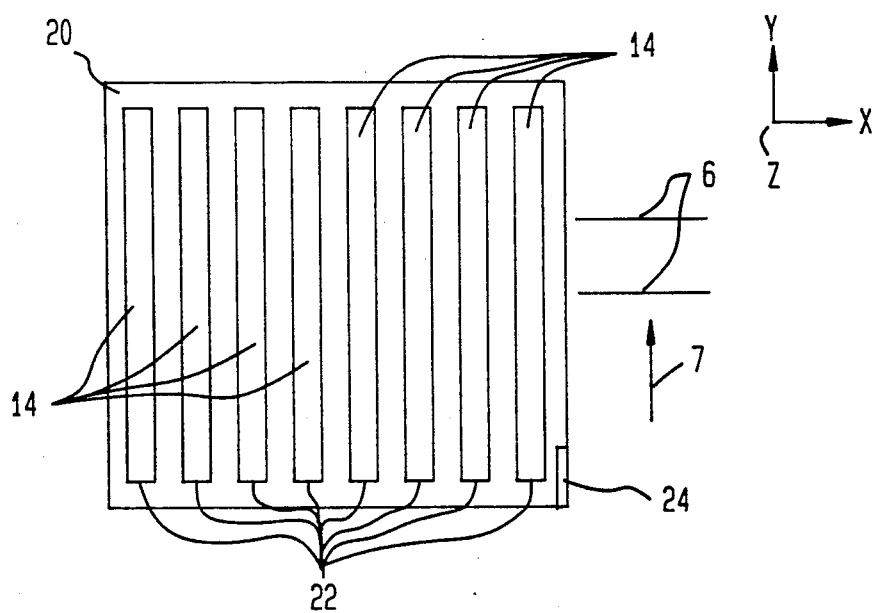
FIG. 3 is a top view of the FIG. 2 arrangement as further processed in accordance with the principles of the present invention to form a modified version of the FIG. 1 cell.

In FIG. 3, the remaining portion of the layer 18 constituting a patterned coating having channels therethrough is designated by reference numeral 20. Multiple channels 22 formed in the patterned layer 20 are shown in FIG. 3. As indicated earlier above, the channels 22 extend through both the layer 20 and the underlying electrode 16 (FIG. 2). Thus, the surfaces seen through the channels 22 of FIG. 3 are portions of the top surface of the solid-electrolyte layer 14.

In a fuel cell structure of the type described herein, electrical connections are made between the electrodes 12 and 16 and an external circuit. To facilitate making such a connection to the top electrode 16 of the FIG. 3 cell, it is advantageous to remove a portion of the patterned coating 20 to expose a surface region of the underlying electrode layer 16. Such an exposed region of the top surface of the layer 16 is shown in the lower right-hand corner of FIG. 3 and is designated by reference numeral 24.

In one specific illustrative embodiment of the principles of the present invention, the area of the top surface of the patterned coating 20 shown in FIG. 3 is approximately 55% of the area of the top surface of the unpatterned layer 18 (FIG. 2). Since the underlying electrode 16 is patterned identically to the coating 20 (except for the contact pad 24 defined in the lower right-hand corner of the coating 20), the area of the top surface of the patterned top electrode of FIG. 3 is also about 55% of the area of the top surface of the unpatterned electrode 16 represented in FIG. 2.

Figure 4:
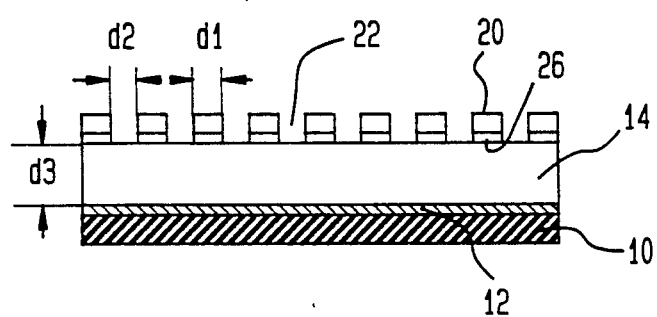
FIG. 4 is a side view of a section of the FIG. 3 cell between X-Z planes 6 as viewed in the direction of arrow 7.

FIG. 4 is a side view of a section of FIG. 3 between planes 6 as viewed in the direction of arrow 7 of FIG. 3. The aforementioned patterned coating 20 and a correspondingly patterned electrode layer 26 are shown in FIG. 4, as are the channels 22.

Since the coating 20 of FIG. 4 is relatively permeable to hydrogen, hydrogen will pass through the coating 20 and reach the permeable electrode layer 26, as it does under normal operation of a priorly known uncoated cell. However, since the coating 20 is relatively impermeable to oxygen, little oxygen will pass through the coating 20 and reach the electrode layer 26. Hence, only a relatively small amount of oxygen is available at that catalytic surface, the layer 26, to combine with the fuel in a fuel-consuming side reaction to form water. Accordingly, most of the fuel that reaches the electrode layer 26 is available to be converted to hydrogen ions or hydronium ions which, in turn, propagate towards the bottom electrode 12.

The channels 22 shown in FIGS. 3 and 4 allow oxygen to enter and pass through the solid-electrolyte layer 14, thereby to be available at the lower electrode 12. Such availability of oxygen at the electrode 12 is essential. Oxygen combines with hydrogen ions or hydronium ions and electrons at the bottom electrode to form water, thereby completing the electrical-energy-producing electrochemical reaction that is characteristic of the depicted cell.

It is evident from FIG. 4 that both hydrogen and oxygen can pass into the solid-electrolyte layer 14 via the channels 22. As a result, some hydrogen fuel and oxygen will pass through the layer 14 and be available at the bottom electrode 12 to combine to form water in a side reaction. But in practice it has been determined that the fuel consumed in this side reaction is considerably less than that consumed at the top electrode of a priorly known cell of the type shown in FIG. 1.

In a specific illustrative embodiment of the present invention, the width d1 (FIG. 4) of the spaced-apart portions of the patterned coating 20 and the width d2 of the channels 22 are about equal to each other and are each approximately 0.1 $\mu$m. In practice, for such dimensions and for a thickness d3 of the layer 14 of about 0.5 $\mu$m, most of the surface area of the bottom electrode 12 is effective to catalyze the desired electrochemical reaction between hydrogen ions or hydronium ions and oxygen to produce water. Ideally, the dimensions d1 and d2 should be very small compared to the electrolyte thickness d3.

The particular fabrication sequence described above for making the correspondingly patterned layers 20 and 26 shown in FIG. 4 is illustrative only. Another feasible sequence for making such a structure involves first patterning the electrode layer 16 of FIG. 1 by conventional photolithographic techniques. The patterned layer 16 can then be coated with a polymer by standard electrophoresis to form the overlying layer 20 whose pattern will be identical to that of the layer 20.

Figure 5:
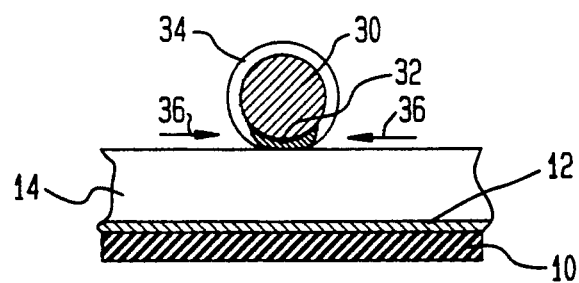
FIG. 5 is a simplified representation of a portion of another specific illustrative cell made in accordance with the principles of the invention.

FIG. 5 shows a portion of another specific illustrative embodiment of the principles of the present invention. In the FIG. 5 embodiment, a fine-gauge gauze mesh is utilized to form the top electrode assembly overlying the surface of the solid-electrolyte layer 14. A cross-section of one strand of such a mesh is shown in FIG. 5.

Illustratively, the strand shown in FIG. 5 comprises a wire 30 made of a material such as copper. One side of the wire 30 is coated with a layer 32 made of a catalytic material such as platinum. The entire surface of the wire 30, except for the portion on which the layer 32 is coated, is covered with a polymer 34. As in the previously described embodiments, the polymer 34 is designed to be relatively permeable to the fuel but relatively impermeable to the oxidizer supplied to the cell. Thus, fuel but only a relatively small amount of oxidizer directed at the mesh wire in the direction of arrows 36 will pass through the polymer 34 and be available on the layer 32. In that way, the amount of oxygen available to combine with fuel at the top electrode (layer 32) to form water in a non-electrical-energy producing side reaction is significantly reduced relative to that of priorly known cells.

Finally, it is to be understood that the various specific arrangements described herein are only illustrative of the application of the principles of the present invention. In accordance with these principles, numerous alternatives and modifications may easily be made by those skilled in the art without departing from the spirit and scope of the invention. For example, although emphasis above has been directed to uniform linear channels formed in the coating 18 and the electrode 16, it is apparent that a variety of other patterns are feasible.

Thus, the channels could be curved and non-uniform. Further, other patterns such as an array of holes would have the same effect. In any case, an essential property of the pattern formed in the electrode 16 is that it not disrupt the connectivity of all remaining area of the electrode to the contact pad 24 (FIG. 3).

Additionally, the coating 18 may be patterned to overlap the underlying patterned electrode. In that way, the sides as well as the tops of the patterned electrode portions can be protected from oxidizer impingement, thereby further reducing the aforespecified undesired side reaction.

What is claimed is:

1. A fuel cell comprising a first electrode assembly and a second electrode assembly separated by and in contact with a solid electrolyte body, wherein the first electrode assembly is permeable to a fuel and an oxidizer, the second electrode assembly is impermeable to the fuel and the oxidizer, and the solid electrolyte body consists essentially of an electron-insulating material which is also ionically conducting to at least a first ionic species and which material is permeable to the fuel, the oxidizer and products of electrochemical reactions of the fuel and the oxidizer, wherein the improvement resides in that the first electrode assembly comprises spaced-apart portions that expose surface regions of said solid electrolyte body, and a coating is disposed on the spaced-apart portions of said first electrode assembly, said coating comprising a material that is relatively permeable to the fuel but relatively impermeable to the oxidizer.

2. A cell as in claim 1 wherein said coating comprises a polymer material.

3. A cell as in claim 2 wherein said polymer material is selected from the group consisting of nylon, polysulfone, polytrifluorochloroethylene and polypropylene.

4. A cell as in claim 1 wherein the spaced-apart portions of said first electrode assembly comprise elongated portions that are parallel to each other.

5. A cell as in claim 4 wherein the widths of said elongated portions are approximately equal to each other.

6. A cell as in claim 5 wherein the widths of the channels between said elongated portions are approximately equal to each other.

7. A cell as in claim 6 wherein the widths of said elongated portions and the widths of said channels are approximately the same.

8. A cell as in claim 7 wherein the widths of said elongated portions and said channels are each approximately 0.1 $\mu$m.

9. A cell as in claim 8 wherein the thickness of said solid electrolyte body is approximately 0.5 $\mu$m.

10. A cell as in claim 1 wherein said species is ionic hydrogen.

11. A cell as in claim 10 wherein each of said first and second electrode assemblies comprises a material selected from the group consisting of platinum, palladium and alloys of platinum and palladium.

12. A cell as in claim 1 wherein said fuel and oxidizer are gaseous.

13. A cell as in claim 1 wherein said first-mentioned material consists essentially of a hydrated oxide of aluminum consisting primarily of the pseudoboehmite structure.

14. A cell as in claim 12 wherein said first-mentioned material is at least 50% of the pseudoboehmite structure.

15. A cell as in claim 12 in which the solid electrolyte body is from 30 Angstrom units to 10 $\mu$m in thickness.

16. A cell as in claim 1 wherein said first-mentioned material consists essentially of a carbon-based polymer.

17. A cell as in claim 15 wherein said carbon-based polymer comprises perfluorinated sulfonic acid.

18. A cell as in claim 1 wherein said oxidizer comprises a gas selected from the group consisting of oxygen and air, and said fuel comprises at least one member selected from the group consisting of hydrogen, methane and methanol.

19. A cell as in claim 1 wherein said first electrode assembly comprises a wire mesh having a catalytic material deposited on one side of said wire mesh in contact with said solid electrolyte body, the remainder of said wire mesh being covered with the coating that is relatively permeable to the fuel but relatively impermeable to the oxidizer.

20. A cell as in claim 1 wherein said second electrode assembly is a composite structure that comprises a layer of catalytic material that is permeable to the fuel and the oxidizer deposited on a substrate that is impermeable to the fuel and the oxidizer.

* * * * *